Oct. 26, 1926.
B. A. STOCKING
1,604,497
AUTOMATIC CUT-OUT SWITCH FOR MOTORS
Filed Sept. 2, 1924
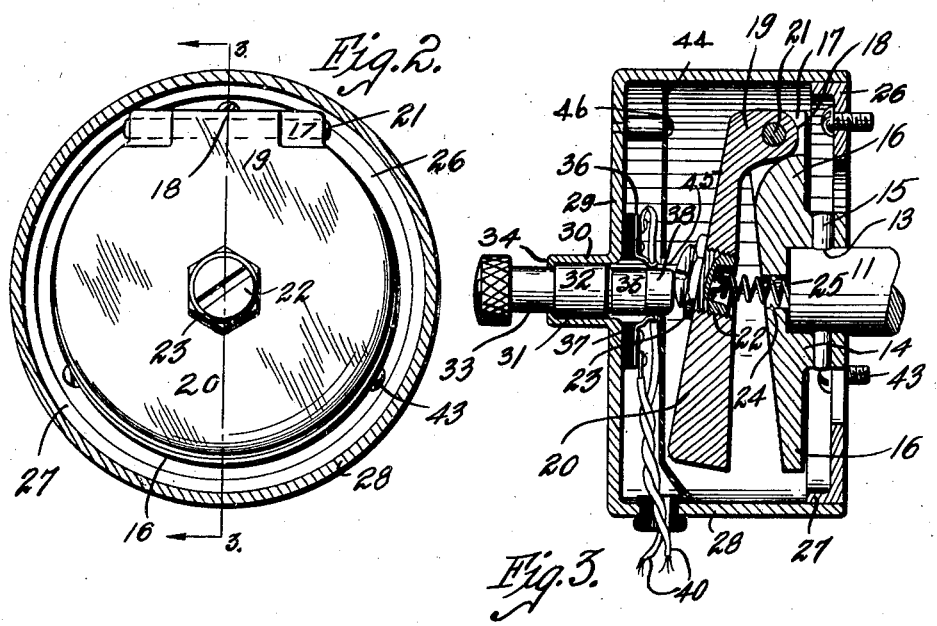
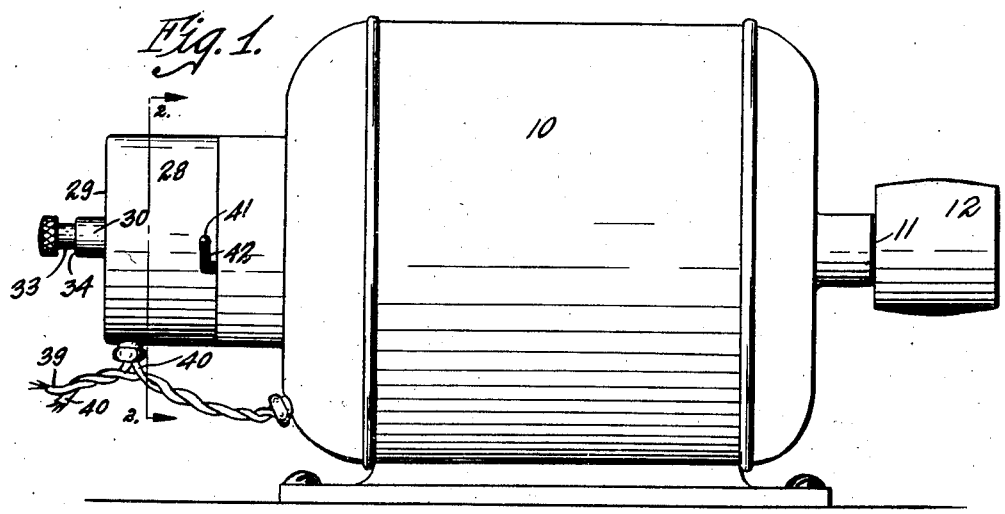
Inventor
Bert A. Stocking
by Orving & Hague Attys.

Patented Oct. 26, 1926.

1,604,497

UNITED STATES PATENT OFFICE.

BERT A. STOCKING, OF AUDUBON, IOWA.

AUTOMATIC CUT-OUT SWITCH FOR MOTORS.

Application filed September 2, 1924. Serial No. 735,369.

This invention relates to improvements in automatic cut-out switches for electric motors.

The object of my invention is to provide a switch device to be used in connection with an electric motor, so arranged that the switch may be manually operated to establish a current through the motor, and to permit the motor to reach a pre-determined speed, after which the switch is automatically retained in a closed position until the motor speed has dropped below a second pre-determined speed, at which time the switch device will be automatically opened to prevent burning out of the motor.

A further object is to provide a switch device of the type above described of simple, durable and inexpensive construction which may be easily and quickly attached to any of the ordinary types of electric motors.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of a motor showing the manner in which my improved device is applied thereto.

Figure 2 is a detail, transverse, sectional view taken on the line 2—2 of Figure 1.

Figure 3 is a detail, longitudinal, sectional view taken on the line 3—3 of Figure 2.

I have used the reference numeral 10 to indicate a motor which is provided with the usual armature shaft 11, one end of which is provided with a pulley 12, the opposite end should be extended slightly beyond the motor casing and provided with a pin opening 13.

Mounted on the outer end of the projecting end of the shaft 11 I have provided a hub 14 secured in position by means of a pin 15 extending through the opening 13. The hub 14 is designed to carry a disk 16, one face of which is perpendicular to the shaft 11, while its opposite face is inclined to the first said face so as to provide an enlarged portion 17. The said enlarged portion 17 is provided with a slot 18 designed to receive a hinge member 19 of a second disk 20.

The said disk 20 has one of its faces inclined to the opposite face in such a manner that as the said inclined faces of the two disks are placed adjacent, the outer faces will be parallel. The member 19 is pivotally secured in the slot 17 by means of a pin 21. The member 19 assumes the form of a lug which extends laterally from the inclined face of the member 20.

The central portion of the member 20 is provided with a screw threaded sleeve 22 having a lock nut 23 by means of which the member 22 may be adjustably secured in the member 20. The member 16 is provided with an opening 24 in alinement with the sleeve 22. The said sleeve and the said opening 24 are designed to receive an extensible coil spring 25, said spring providing means whereby the free edge of the member 20 may be normally moved outwardly from the member 16, as clearly shown in Figure 3.

Surrounding the shaft 11 is an annular plate 26 having a flange 27 designed to receive a cylindrical shell 28 designed to form a housing for the members 16 and 20, said shell 28 having an end member 29, the central portion of which is provided with a hub 30. The said hub 30 has an opening 31 designed to receive a slidable switch device 32 having a shoulder 33 designed to engage inwardly extending flanges 34 of the hub 30. This provides means whereby the outward movement of the member 32 will be limited.

The member 32 is formed of insulating material such as hard rubber or bakelite. The inner portion of the member 32 is provided with a collar 35 which is formed of an electrical conductor. The inner end of the member 32 is designed to rest against the outer end of the sleeve 22 when the member 20 is in its outward limit of movement, with the shoulder 33 against the flange 34.

A pair of contact members 36 are provided and mounted on insulating blocks 37, said contacts being designed to make engagement with the conductor 35 when the member 32 is moved inwardly. The free ends of the contacts 36 rest on the inwardly extending end 38 of the member 32 when the said member is at its outward limit of movement.

The motor 10 is provided with conductor wires 39 and 40. The wire 40 is divided and has one end connected to one of the contacts 36, while the other end is connected with the opposite contact 36. Thus it will be seen that when the switch member 32 is moved to its outer limit of movement, the circuit formed by the conductors 39 and 40 will be opened and the motor 10 will be stopped, but if the switch member 32 is moved inwardly, then the conductor 35 will engage the contacts 36 causing the circuit to be closed and rotation imparted to the motor armature.

The inward movement of the member 32 will also cause the member 20 to be moved into engagement with the member 16, in which case the outer faces of the two members are parallel with the pivot member 21 mounted in a plane extending parallel with the outside faces of said disk and substantially midway between the said disks when in their closed position. The member 20 is held in this position against the action of the spring 25.

It will readily be seen that after the motor has obtained a certain speed, the member 20 will be automatically retained adjacent to the member 16 by centrifugal action, and will retain such position until the motor speed has been reduced to a certain predetermined point, or at such point where the spring 25 will overcome the centrifugal action of the member 20, at which time the member 20 will be swung outwardly by the action of the spring 25, which in turn will push the switch device 32 outwardly and break the circuit, causing the motor to be stopped. This provides means whereby the tension of the spring 25 may be adjusted by the sleeve 22 and the nut 23 so that any overloading of the motor will cause the speed to be reduced to such an extent that the member 20 will be permitted to move outwardly before the excessive current caused by the reduction in speed will have had time to burn it out, and thus provide means whereby the switch device will be automatically thrown out of operation at the time the motor speed has been reduced to a certain predetermined point.

Thus it will be seen that by constructing the switch device 32 so that it may be manually operated for closing the circuit and automatic means for opening the circuit, I have provided means whereby the automatic circuit opening means may be held out of operation until the desired motor speed has been obtained, after which the automatic governor will permit the circuit to remain closed.

The shell 28 is detachably connected to the flange 27 by means of pins 41 and bayonet slots 42, said shell being removed by first imparting a slight rotary movement to the same, and then an outward movement, thus providing means whereby the operator may have easy access to the interior of the device for adjusting the spring 25. The member 26 is secured to the side of the motor frame by means of set screws 43.

A disk 44 formed of insulating material is provided between the member 20 and the conductors 40, the member 38 passing through an opening 45. The said disk 44 is secured in position by means of screws 46. This provides means whereby the conductor 40 will be protected from the governor device 20.

Thus it will be seen that I have provided an automatic cut-out for motors of simple, durable and inexpensive construction, which is particularly adapted to be used on small motors such as used to operate washing machines.

I claim as my invention:

1. A governor device comprising a rotary hub provided with a disk, one face of which is perpendicular to said hub and having its opposite face inclined with respect to the first said face, the enlarged portion of said inclined faces being provided with a slot, a second disk member having one face inclined relative to its opposite face and so arranged that when the inclined faces are placed adjacent the outer faces of said disks will be parallel, means secured to the thinner edge of said second disk for entering the groove of the first said disk, a pin for pivoting said members together, yieldable means for swinging the free edge of the second disk away from the first said disk.

2. A governor device comprising a rotatively mounted shaft, a disk member mounted centrally thereon, one face of said disk being perpendicular to said shaft and its opposite face inclined with the first said face, a second disk member of the same diameter as the first said disk member with inclined faces similar to the faces of the first said disk, so arranged that when in one position the inclined faces of the two disks may be placed together with the outer faces parallel with each other, means for pivotally connecting the thinner portion of one disk adjacent to the heavy portion of the opposite disk, the pivot center being mounted in such a manner that as the disks are rotated the pivotally mounted disk will move inwardly toward the fixed disk, a spring device for yieldably holding the pivoted disk from the fixed disk.

3. A governor device comprising a rotatively mounted shaft, a disk member mounted centrally thereon, one face of said disk being perpendicular to said shaft and its opposite face inclined with the first said face, a second disk member of the same diameter as the first said disk member with inclined faces similar to the faces of the first said disk, so arranged that when in one position the inclined faces of the two disks may be placed together with the outer faces parallel with each other, means for pivotally connecting the thinner portion of one disk adjacent to the heavy portion of the opposite disk, the pivot center being mounted in such a manner that as the disks are rotated the pivotally mounted disk will move inwardly toward the fixed disk, a spring device for yieldably holding the pivoted disk from the fixed disk, and means for adjusting the tension of said spring.

BERT A. STOCKING.